(12) United States Patent
Chen et al.

(10) Patent No.: US 9,485,365 B2
(45) Date of Patent: *Nov. 1, 2016

(54) CLOUD STORAGE FOR IMAGE DATA, IMAGE PRODUCT DESIGNS, AND IMAGE PROJECTS

(71) Applicant: Shutterfly, Inc., Redwood City, CA (US)

(72) Inventors: Eugene Chen, Belmont, CA (US); Preeti Nathan, San Carlos, CA (US); Trynne Anne Miller, San Francisco, CA (US); Wiley H. Wang, Pacifica, CA (US); Zhaohui Feng, Fremont, CA (US); Erik Weitzman, Redwood City, CA (US)

(73) Assignee: Shutterfly, Inc., Redwood City, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/741,197

(22) Filed: Jan. 14, 2013

(65) Prior Publication Data

US 2013/0132444 A1    May 23, 2013

Related U.S. Application Data

(63) Continuation-in-part of application No. 12/729,466, filed on Mar. 23, 2010, now Pat. No. 8,363,888, and a continuation-in-part of application No. 12/406,873, filed on Mar. 18, 2009, now Pat. No. 8,131,114.

(60) Provisional application No. 61/593,080, filed on Jan. 31, 2012.

(51) Int. Cl.
*H04N 1/00* (2006.01)
*G06F 17/30* (2006.01)
(Continued)

(52) U.S. Cl.
CPC ...... *H04N 1/00132* (2013.01); *G06F 17/3028* (2013.01); *H04N 1/00137* (2013.01); *H04N 1/00145* (2013.01); *H04N 1/00167* (2013.01); *H04N 1/00172* (2013.01); *H04N 1/00188* (2013.01); *H04N 1/00196* (2013.01);
(Continued)

(58) Field of Classification Search
CPC ............... H04L 67/02; H04L 67/1095; G06F 17/30265; G06F 17/30274; G06F 17/3089; H04N 1/00132; H04N 1/00148; H04N 1/00167; H04N 1/00196
USPC ........ 709/203, 217, 219, 225; 715/202, 752; 348/222.1
See application file for complete search history.

(56) References Cited

U.S. PATENT DOCUMENTS 6,324,545 B1 * 11/2001 Morag ............... H04N 1/00132
  358/408
6,526,443 B1   2/2003 Goldsmith
(Continued)

*Primary Examiner* — Ramy M Osman
(74) *Attorney, Agent, or Firm* — Xin Wen

(57) ABSTRACT

A method for proactively creating a photobook includes identifying a group of images by a computer system and automatically creating a design for a photobook by the computer system without receiving a user's request for designing a photobook if the number of images in the group is determined to be within a predetermined range. Pages of the photobook incorporate a plurality of images in the group. The method further includes presenting the design of the photobook to a user for preview and receiving an order from the user for a physical manifestation of the photobook based on the design.

19 Claims, 14 Drawing Sheets

(51) Int. Cl.
*H04L 29/08* (2006.01)
*H04N 101/00* (2006.01)
(52) U.S. Cl.
CPC ...... *H04N1/00421* (2013.01); *H04N 1/00435* (2013.01); *H04N 1/00442* (2013.01); *H04N 1/00453* (2013.01); *H04N 1/00456* (2013.01); *H04N 1/00458* (2013.01); *H04N 1/00461* (2013.01); *H04L 67/02* (2013.01); *H04L 67/1095* (2013.01); *H04N 2101/00* (2013.01)

(56) References Cited

U.S. PATENT DOCUMENTS

| | | | |
|---|---|---|---|
| 6,771,801 B1* | 8/2004 | Fisher | H04N 1/00164 283/67 |
| 6,850,247 B1* | 2/2005 | Reid | G06T 11/60 345/611 |
| 7,058,885 B1* | 6/2006 | Thormodsen | B42F 5/00 715/212 |
| 7,289,132 B1* | 10/2007 | Reid | G06F 17/30265 345/660 |
| 7,325,193 B2 | 1/2008 | Edd | |
| 7,654,575 B1* | 2/2010 | Haag | G06Q 30/06 281/15.1 |
| 7,656,543 B2* | 2/2010 | Atkins | H04N 1/00132 358/1.13 |
| 7,743,322 B2* | 6/2010 | Atkins | G06F 17/509 715/243 |
| 7,916,322 B2 | 3/2011 | Pineau | |
| 7,970,240 B1* | 6/2011 | Chao | G06F 17/30274 382/305 |
| 8,040,551 B2* | 10/2011 | Ono | H04N 1/00132 358/1.18 |
| 8,161,377 B2* | 4/2012 | Atkins | G06T 11/60 715/243 |
| 8,762,826 B2* | 6/2014 | White | 715/202 |
| 8,848,972 B2* | 9/2014 | Chen | G06F 17/212 382/100 |
| 2002/0135621 A1* | 9/2002 | Angiulo | G06F 17/3089 715/838 |
| 2002/0174185 A1 | 11/2002 | Rawat | |
| 2003/0063770 A1* | 4/2003 | Svendsen et al. | 382/100 |
| 2003/0182210 A1* | 9/2003 | Weitzman | G06Q 10/109 705/26.5 |
| 2004/0032599 A1* | 2/2004 | Atkins | H04N 1/00132 358/1.9 |
| 2004/0260614 A1* | 12/2004 | Taratino et al. | 705/26 |
| 2007/0070408 A1* | 3/2007 | Ono | H04N 1/00132 358/1.15 |
| 2008/0304718 A1* | 12/2008 | Ryuto | G06K 9/00228 382/118 |
| 2009/0158183 A1* | 6/2009 | McCurdy | G06F 17/30265 715/764 |
| 2011/0292232 A1* | 12/2011 | Zhang et al. | 348/222.1 |
| 2012/0011450 A1* | 1/2012 | To | 715/752 |
| 2012/0166516 A1* | 6/2012 | Simmons | H04L 67/1095 709/202 |
| 2012/0179571 A1* | 7/2012 | Grosso, III | 705/26.5 |
| 2012/0188405 A1* | 7/2012 | Morrison et al. | 348/231.2 |
| 2012/0254108 A1* | 10/2012 | Wedewer | H04W 4/003 707/618 |
| 2014/0304622 A1* | 10/2014 | Jorasch | H04L 51/28 715/753 |
| 2016/0078322 A1* | 3/2016 | Yamaji | H04N 1/00 382/224 |
| 2016/0093083 A1* | 3/2016 | Chen | G06F 17/212 382/224 |

* cited by examiner

Shutterfly Cloud Application

Manager: Raymond

Roles and access Levels

| | Owner | Editor | Contributor | Commenter | Reader |
|---|---|---|---|---|---|
| Raymond | ● | ● | ● | ● | ● |
| Wife | ○ | ● | ● | ● | ● |
| Grandparent 1 | ○ | ○ | ● | ● | ● |
| Grandparent 2 | ○ | ○ | ● | ● | ● |
| Sibling | ○ | ○ | ● | ● | ● |
| Relative | ○ | ○ | ● | ● | ● |
| Friend | ○ | ○ | ○ | ○ | ● |

Figure 13

CLOUD STORAGE FOR IMAGE DATA, IMAGE PRODUCT DESIGNS, AND IMAGE PROJECTS

PRIORITY PATENT APPLICATIONS

The present application is a continuation-in-part application of and claims priority to commonly assigned pending U.S. patent application Ser. No. 12/729,466, titled "Proactive photobook creation", filed on Mar. 23, 2010. U.S. patent application Ser. No. 12/729,466 is a continuation-in-part patent application of and claims priority to commonly assigned U.S. patent application Ser. No. 12/406,873 (issued as U.S. Pat. No. 8,131,114), titled "Smart photobook creation", filed on Mar. 18, 2009. The present patent application also claims priority to provisional U.S. patent application 61/593,080, entitled "Cloud storage for image data, image product designs, and image projects" filed on Jan. 31, 2012. The disclosures of the above applications are incorporated herein by reference.

TECHNICAL FIELD

This application relates to utilization of digital images, and more specifically, to the creation, storing and sharing of images, image product designs, and image projects.

BACKGROUND OF THE INVENTION

In recent years, photography has been rapidly transformed from chemical based technologies to digital imaging technologies. Images captured by digital cameras can be stored in computers and viewed on display devices. Users can also produce image prints based on the digital images. Such image prints can be generated locally using output devices such an inkjet printer or a dye sublimation printer or remotely by a photo printing service provider. Other products that can be produced using the digital images can include photo books, photo calendars, photo mug, photo T-shirt, and so on. A photo book can include a cover page and a plurality of image pages each containing one or more images. Designing a photobook can include many iterative steps such as selecting suitable images, selecting layout, selecting images for each page, selecting backgrounds, picture frames, overall Style, add text, choose text font, and rearrange the pages, images and text, which can be quite time consuming. It is desirable to provide methods to allow users to design and produce photo albums in a time efficient manner.

Furthermore, with the proliferation of digital devices, people now acquire, edit, share, and organize images on different devices, at and away from homes. There is an increased need for an imaging infrastructure to provide uniform and ubiquitous imaging services to customers for storing images, as well as image product designs, and photostories.

SUMMARY OF THE INVENTION

The disclosed methods and systems can significant increase the awareness of users in personalized image products such as photobooks. A user can also be given a chance to learn and visualize what a photobook might look like before he or she realizes that the possibility of a photobook or a photobook design based on his or her images. The memories of the users can thus be better preserved in more colorful and tangible ways for the users.

Furthermore, the disclosed systems and methods provide more convenient ways for a user to obtain designs of photo books. Images in a group can be automatically arranged into a photobook design without being asked by a user. The user is provided with an option to review, to edit, and to request a photobook to be made according to the design. As a result, the time and effort for a user to obtain a photobook are significantly reduced.

Additionally, the disclosed systems and methods can significantly save users' time spent on transferring, saving, or organizing images from multiple devices. The disclosed systems and methods allow image projects and image product designs created on a device or at an image service center to be automatically stored at cloud storage and made accessible to other devices that are connected or not connected to the image service center. The accesses to a group of or individual images, image product designs, and photostories by different users can be flexibly defined by the owner of the data.

Another advantage of the disclosed system is that the creation (users' devices or image service center) of the secondary image project and the storage and sharing (e.g. cloud storage) of the secondary image project can be performed by different systems, which can minimize cost of data traffic over the network and allow each system to be optimized for it individual functions.

In one general aspect, the present invention relates to a computer-implemented method for providing image services over a computer network. The method includes: establishing a unified data structure between an image service center and an cloud storage system, wherein the unified data structure define images and secondary image projects associated with a first user; storing images in the image service center according to the unified data structure; automatically sending the images from the image service center to the cloud storage system; automatically storing the images are stored according to the unified data structure in the cloud storage system; automatically creating a secondary image project incorporating one or more of the images; automatically storing the secondary image project in the cloud storage system; and allowing users' devices to access the secondary image project stored at the cloud storage system.

Implementations of the system may include one or more of the following. The secondary image project can be automatically created without receiving user request. The secondary image project can be automatically created by one or servers in the image service center. The secondary image project is automatically created by a client application in communication with the image service center. The secondary image project is automatically created on a user device using a web interface in communication with the image service center. The secondary image project can include an image product design. The unified data structure can include a user identification, one or more image albums, and one or more folders each comprising one or more secondary image projects. The computer-implemented method can further include allowing a first user to define roles of the users in accessing the secondary image project stored in the cloud storage system. The users' devices can be allowed to access the secondary image project stored at the cloud storage system based on corresponding users' access roles. The step of automatically creating a secondary image project can include automatically identifying a group of images and determining, by a computer system, if the number of images in the group is within a predetermined range, wherein the secondary image project is automatically created without receiving a user request if the number of images in the group is determined to be within a predetermined range. The secondary image project includes a photobook that incorporates the images associated with the user. The computer-implemented method can further include automatically selecting a format or a style for the design of the photobook. The computer-implemented method can further include assigning a portion of the images into a first page group and a second page group each comprising one or more images; placing the first page group of one or more images in the first page of the photobook; and placing the second page group of one or more images in the second page of the photobook. The computer-implemented method can further include automatically selecting a first page layout from a library of page layouts, wherein the first page group of one or more images are placed in the first page according to the first page layout; and automatically selecting a second page layout from the library of page layouts, wherein the second page group of one or more images are placed in the second page according to the second page layout. At least two of the portion of images can be separated into the first page group and the second page group based on capture times of the two images. At least two of the portion of images can be separated into the first page group and the second page group based on color content of the two images. At least two of the portion of images can be separated into the first page group and the second page group based on image-capture locations of the two images.

In one general aspect, the present invention relates to a computer-implemented method for providing image services over a computer network. The method includes establishing a unified data structure between an image service center and an cloud storage system, wherein the unified data structure define images and secondary image projects associated with a first user; enabling an image product design to be created incorporating one or more of the images; automatically storing the image product design according to the unified data structure in the image service center; automatically sending the image product design to the cloud storage system; automatically storing the image product design according to the unified data structure in the cloud storage system; and allowing users' devices to access the image product design stored at the cloud storage system.

Implementations of the system may include one or more of the following. The image product design can be automatically created without receiving a request from a user. The image product design can be initiated by a user and enabled by the image service center.

In another general aspect, the present invention relates to a method for proactively creating a photobook. The method includes identifying a group of images by a computer system; automatically creating a design for a photobook by the computer system without receiving a user's request for designing a photobook if the number of images in the group is determined to be within a predetermined range, wherein pages of the photobook incorporate a plurality of images in the group; presenting the design of the photobook to a user for preview; and receiving an order from the user for a physical manifestation of the photobook based on the design.

Implementations of the system may include one or more of the following. The group of images can be received in an upload from a computer device to the computer system. The group of images can be formed in an electronic share from a first user to a second user. The group of images can be clustered when they are selected for printing. The group of images can be clustered when the images are placed in an electronic folder or an electronic album. The group of images can be tagged by a common label. The method can further include automatically selecting a format or a style for the design of the photobook before the step of automatically creating a design for a photobook by a computer system. The method can further include determining if the number of images in the group is determined to be within a predetermined range, wherein the predetermined range varies depending on if the group of the images is clustered in an upload from a computer device to the computer system, or when the images are selected for printing, or when the images are placed in an electronic folder or an electronic album, or when the images are placed in an electronic folder or an electronic album, or the images are tagged by a common label. The step of automatically creating a design for a photobook can include assigning at least a portion of the plurality of images into a first page group and a second page group each comprising one or more images; placing the first page group of one or more images in the first page of the photobook; and placing the second page group of one or more images in the second page of the photobook. The step of automatically creating a design for a photobook can further include automatically selecting a first page layout from a library of page layouts, wherein the first page group of one or more images are placed in the first page according to the first page layout; and automatically selecting a second page layout from the library of page layouts, wherein the second page group of one or more images are placed in the second page according to the second page layout. At least two of the plurality of images can be separated into the first page group and the second page group based on capture times of the two images. The two images can be placed on a same page if the two images were captured within a predetermined period of time. The two images can be placed on a different page if the two images were captured within a predetermined period of time. At least two of the plurality of images can be separated into the first page group and the second page group based on color content of the two images. The two images can be placed on a same page if popular colors in the two images are within a predetermined distance in a color space. The two images can be placed on a different page if popular colors in the two images are within a predetermined distance in a color space. At least two of the plurality of images can be separated into the first page group and the second page group based on image-capture locations of the two images. The method can further include allowing the user to remove at least one image from the first page or to move an image from the first page to the second page after the step of presenting the design of the photobook. The method can further include allowing the user to select the format or the style for the design of the photobook page after the step of presenting the design of the photobook. The method can further include making the physical manifestation of the photobook in accordance to the design. The step of presenting the design of the photobook to a user for preview can include sending an email message to the user to present the design of the photobook.

In another general aspect, the present invention relates to a method for proactively creating a photobook. The method includes identifying a group of images by a computer system; automatically selecting a format and a style for a photobook by the computer system if the number of images in the group is determined to be within a predetermined range; automatically creating a design for the photobook in the selected format and the style by the computer system without receiving a user's request for designing a photobook using the group of images, wherein pages of the photobook incorporates a plurality of images in the group; presenting the design of the photobook to a user for preview; and receiving an order from the user for a physical manifestation of the photobook based on the design.

In another general aspect, the present invention relates to a method for proactively creating a photobook. The method includes identifying a group of images by a computer system; automatically creating a design for a photobook by the computer system without receiving a user's request for designing a photobook if the number of images in the group is determined to be within a predetermined range, wherein pages of the photobook incorporate a plurality of images in the group; presenting the first design of the photobook to a user for preview; detecting a change in the group of images; automatically modifying the first design of photobook to create a second design for the photobook in response to the change in the group of images; and presenting the second design of the photobook to a user for preview.

Implementations of the system may include one or more of the following. The change in the group of images can include addition to the group of images or removal of images from the group of images. The change in the group of images can include a change in an image property of the group of images. The image property can include a tag, a keyword, a title of a folder where the images are placed, or metadata at least one of the images.

BRIEF DESCRIPTIONS OF THE DRAWINGS

The accompanying drawing, which are incorporated in and form a part of this specification, illustrate embodiments of the invention and, together with the description, serve to explain the principles of the invention:

FIG. 13 is a schematic illustration of an exemplified user interface for the network-based image service system.

DETAILED DESCRIPTION OF THE INVENTION

In the present invention, the term "photo album" refers to a book that includes one or two cover pages and one or more image pages. Each of the image pages can include one or more images. The image pages can also include text or image caption. The image layout can also include a background pattern. In the imaging industry, photo albums can include photo books, scrapbooks, snap books, and any books form including bound image pages.

Figure 1:
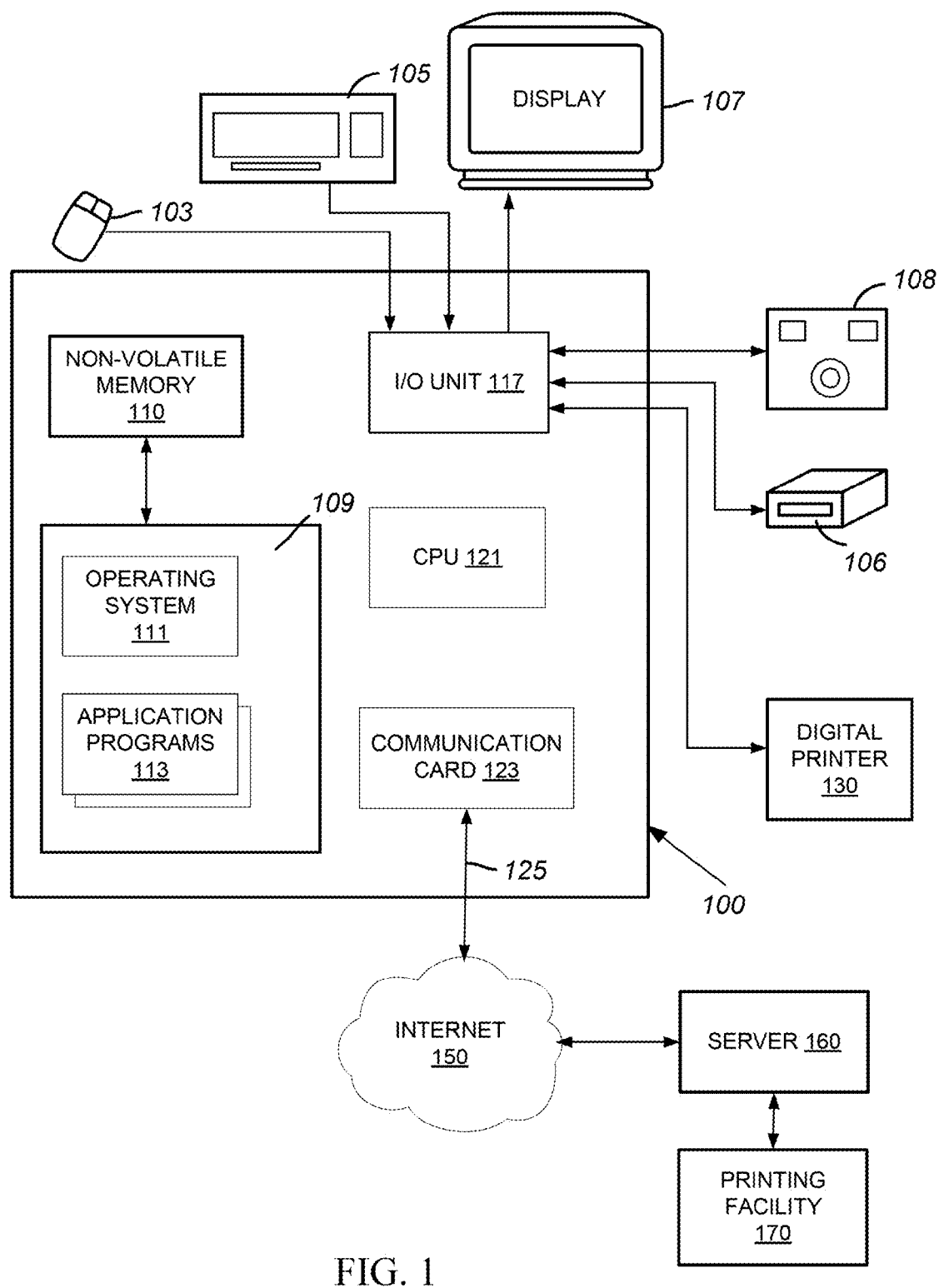
FIG. 1 is a block diagram of a system for imaging applications compatible with the present invention.

A computer 100 illustrated in FIG. 1 represents an exemplified hardware setup for executing software that allows a user to perform tasks such as communicating with other computer users, accessing various computer resources, and viewing, creating, or otherwise manipulating electronic content, that is, any combination of text, images, movies, music or other sounds, animations, 3D virtual worlds, and links to other objects. The system includes various input/output (I/O) devices (mouse 103, keyboard 105, display 107) and a computer 100 having a central processor unit (CPU) 121, an I/O unit 117 and a memory 109 that stores data and various programs such as an operating system 111, and one or more application programs 113. The computer 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 such as a cable modem, DSL service or wireless Internet connection. The computer 100 of FIG. 1 also can be connected to various peripheral I/O devices. One of the more popular of such peripheral devices is a digital camera 108. The digital camera 108 enables users to take pictures (i.e., images), which are saved in memory within the digital camera 108 in a digital format. After taking and storing the images, the user can connect the digital camera 108 to a computer 100 in order to upload the digital images to the computer's disk drive or other non-volatile memory 110. The user can also wirelessly transfer digital images in the digital camera to the computer 100. Once the digital images are uploaded to the computer 100, the user can erase the digital images from the memory of the digital camera 108 so that the user can take and store additional images using the digital camera 108. Typically, the digital camera 108 is connected to the computer 100 only while the user is uploading images to the computer's disk drive or other non-volatile memory 110. Once the digital images are stored on the computer 100, a user can perform various operations on them. For example, an image viewer application can be used to view the images. A photo editing application can also be used to touch-up or otherwise modify the images. The computer 100 can communicate via Internet 150 with a server 160 provided by a service provider, such as Shutterfly, Inc. A user operating the computer 100 can upload or download images between the computer and the server 160. The user can also electronically share his or her images facilitated by the service provider.

It should be noted that the computer 100 can exist in other configurations from the example shown in FIG. 1 and described above. The computer can include a mobile device such as a smart phone, a wireless enabled mobile computer such as a laptop computer or a tablet computer.

Although large numbers of images are frequently captured by digital cameras, people often are not aware of the types of customized digital enabled imaging products that are available from image service providers such as Shutterfly, Inc. Customizable image products can include photobooks, photo calendars, photo greeting cards, photo stationeries, photo mugs, photo T-shirt, and so on, which can provide significant enhanced ways for preserving people's treasured memories in addition to viewing images on electronic displays.

Additionally, significant obstacles exist even for people who are aware of the availability of customizable image products. The design of a photobook, for example, can take significant amount of time and effort. A user has to select photos for many pages including a cover page. The user needs to select a format, and a style for the photobook. The user needs to design or select layout for each page, sort images for different pages, and place images onto individual pages. The photobook design can take many iterative steps such as selecting suitable images, selecting layout, selecting images for each page, add text, which can often take hours to complete.

Once the user approves a design, the photobook can be made according to the design locally by a printer 130 connected to the computer 100, or remotely by the imaging service provider at a printing facility 170.

Figure 2:
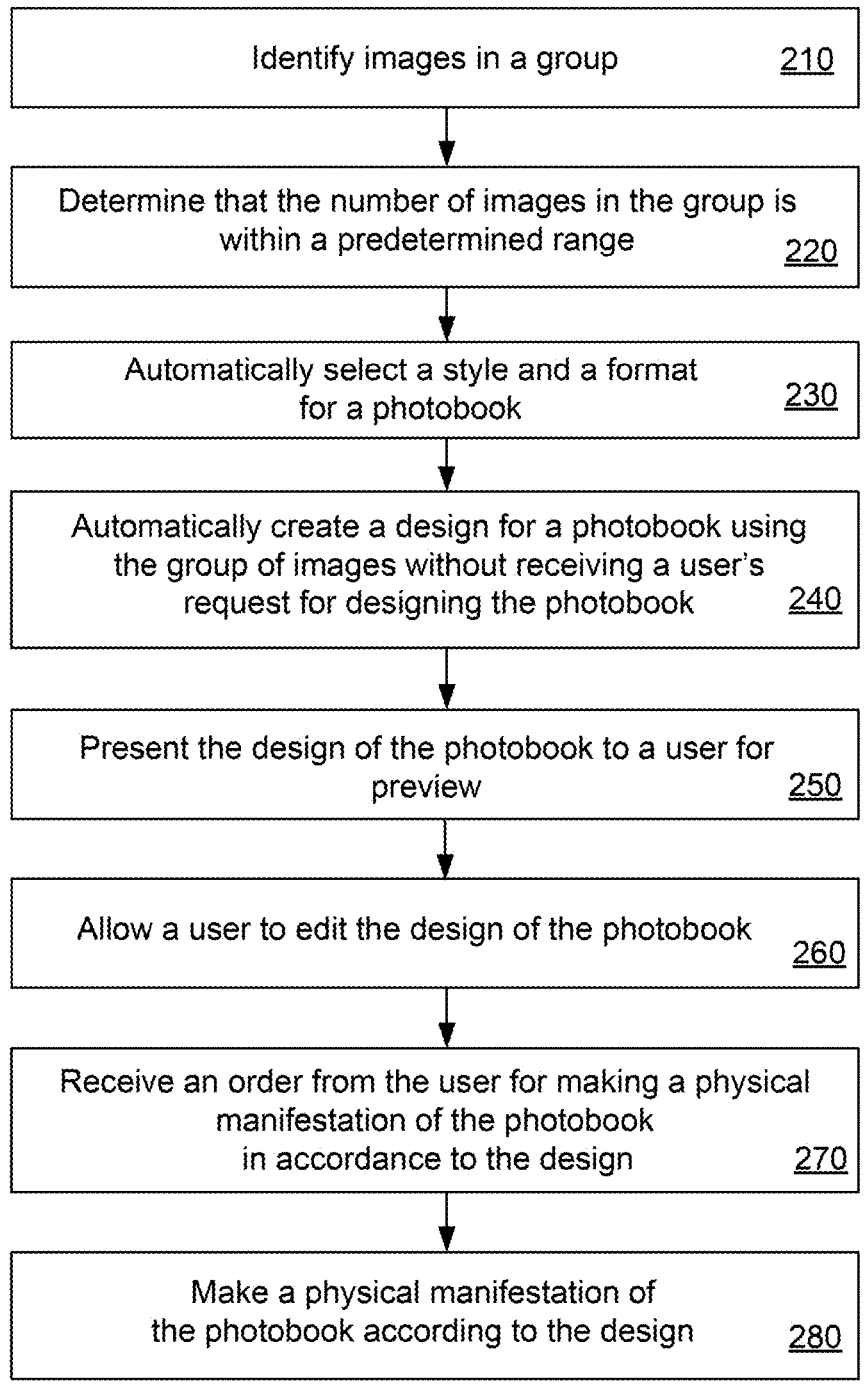
FIG. 2 shows a flow chart for proactively creating a photobook in accordance to the present invention.
Figure 3:
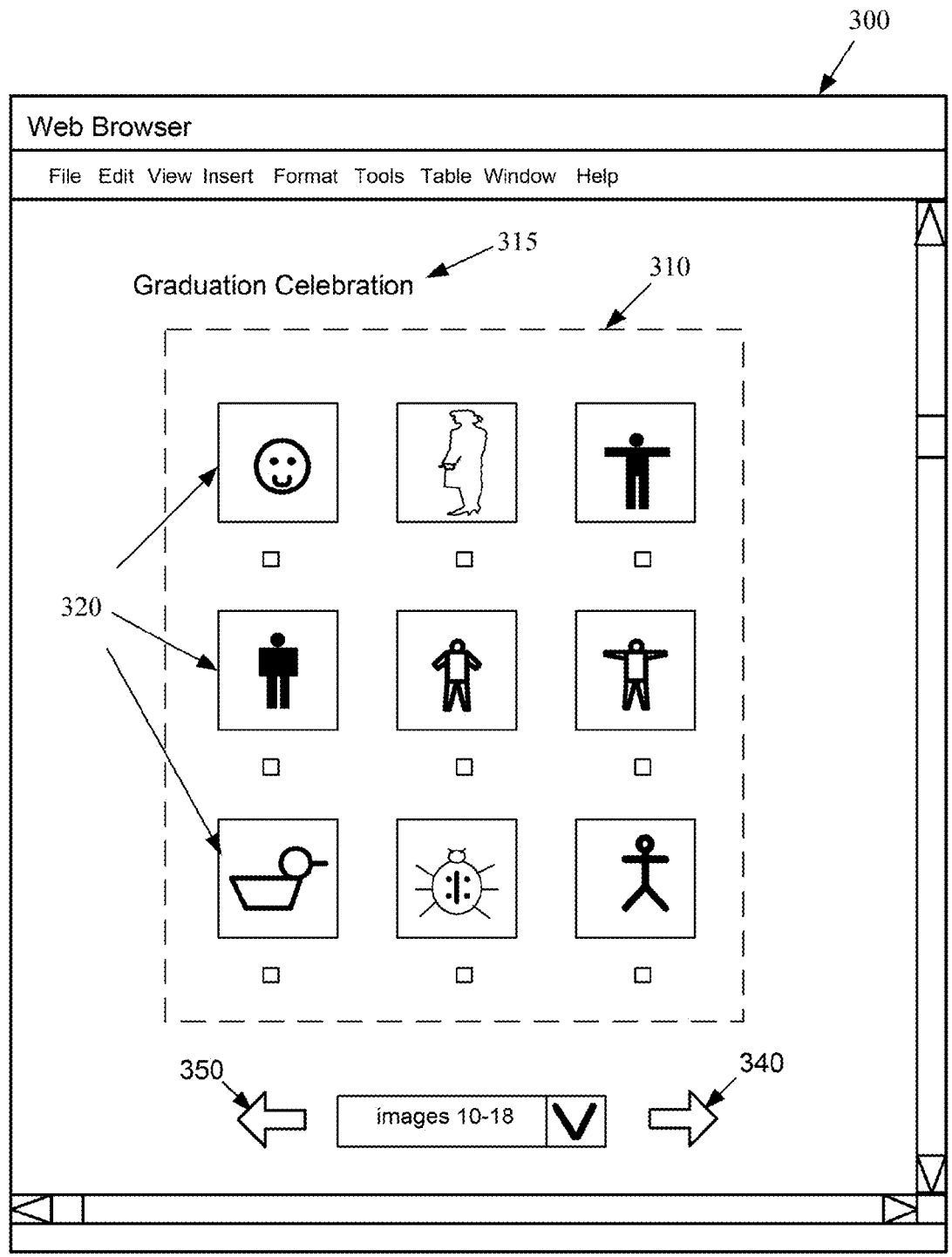
FIG. 3 is an exemplified user interface showing an image album having a plurality of images.

Referring to FIG. 2, a photobook can be made available to a user in the following general process. It should be noted that the process can include substeps within each step and other steps not shown in FIG. 2. A group of images are identified by a computer system such as the computer 100 or the server 170 (step 210). The images can be received in a group in an upload from a computer device (e.g. the computer 100, FIG. 1) to the computer system (e.g. the server 170, FIG. 1), or from a digital camera to a computer (e.g. the computer 100, FIG. 1). The images can form a group when the images are shared in an electronic message from a first user (e.g. operating the computer 100, FIG. 1) to a second user via a computer server (e.g. the server 170, FIG. 1). The images can be identified when a group of images are selected for printing. The images can also be identified when the images are placed in an electronic folder or an electronic album for an occasion or event, or simply for collecting pictures of a theme or interest (which can be called "a picture picker"). As shown in FIG. 3, a user interface 300 (e.g. a web browser) displays an image album 310 that can have an album name 315 such as "Graduation Celebration" and a plurality of images 320. The image album 310 can include several pages of images that a user can navigate to and view by clicking arrow buttons 340, 350. Furthermore, images may be tagged by a user or the service provider by labeled such as "Hawaiian Vacation", "Soccer Team", "Birthday Party", "Favorite", etc. A group of images can be identified when they are tagged by a common label such as "Hawaiian Vacation".

The computer system then determines if the number of images is within a predetermined range (step 220). For example, the threshold for the number of images in the group can be 20 (i.e. the predetermined range is 20 or higher). If the images in the group are within the predetermined range, the computer system automatically selects a style and a format for a photobook (step 230). The styles of photobooks can include, for example, romance, seasonal, every day, vacation, travel, wedding, baby, kids, birthday, school memories, sports, Mother's day, holiday, etc., each of which can include more detailed styles. A style of a photobook can specify the theme of the photobook such as colors, the background themes, the patterns, the picture frames, the text font, positions of the text, and images on the inner pages as well as covers of the photobook. The format of a photobook can include the size e.g. 5"×7", 8"×8", 12"×12" etc.), the paper stock materials for the pages and the cover, the type of binding, and the finish of the photobook.

In some embodiments, the predetermined range can depend on how the group of images is selected, whether they are selected for printing, or for electronic share, or placed in a single electronic folder or album, or received in an image upload, or tagged by a same label. For example, the threshold number can be 15 for the images that are selected for printing, and 20 for the images that are selected for electronic sharing. The different threshold image numbers for different image aggregation sources is based on the observation that users conducting different image operations often have different degrees of interests in seeing the design and making a physical image-based product such as a photobook. The above described flexibility in image threshold numbers can provide service best suitable to different segments of users.

The style and the format of the photobook can have default selections such as "everyday" for the photobook style and 8" by 8" hardcover for the photobook format. In some embodiments, the style and the format of the photobook can be selected based on knowledge of the images in the group. Specifically, an image property can be extracted from the group of identified images. For example, if the images are identified by a common tag label "Hawaii Vacation", a photobook style for vacation, or specifically for Hawaiian vacation, may be automatically selected. In another example, if the images identified are in an electronic album called "Molly's Birthday Party", a birthday photobook style can be automatically selected. In another example, the album name 315 (FIG. 3) in which the images (320, FIG. 3) are identified can be used to automatically select a photobook style (such as a "Graduation" photobook style).

The computer system automatically produces a design incorporating the identified images using the automatically selected photobook style and format (step 240). It should be noted that the photobook design using the group of identified images, and the associated selections of photobook style and formats, are proactively and automatically implemented by the computer system without receiving a request from a user. The approach described in the present systems and methods is different from conventional photobook creation processes wherein users initiate projects to design photobooks. As described above, conventional photobook-making methods require awareness and familiarity of the photobooks by the users. The projects of creating photobooks can be very time consuming.

Figure 4:
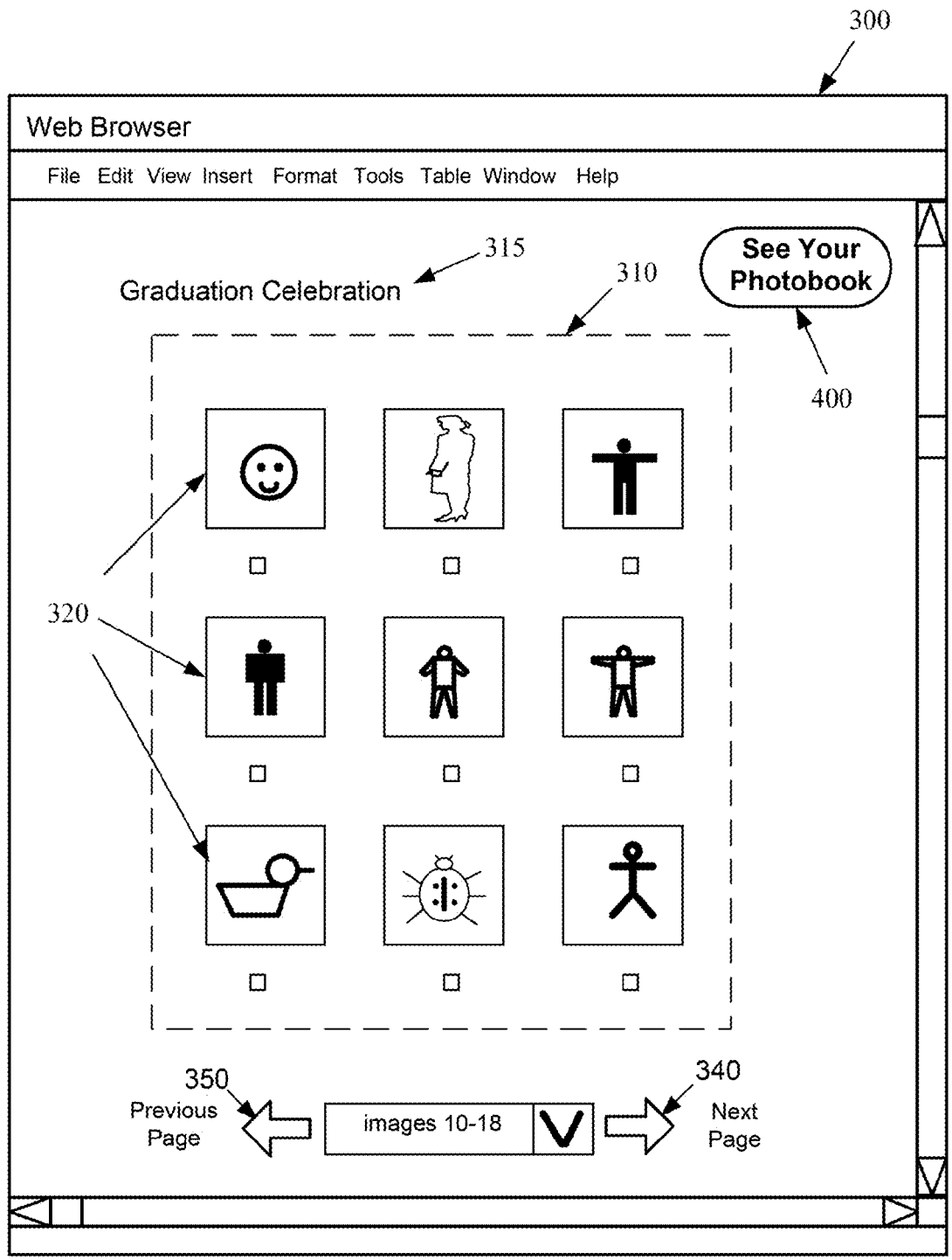
FIG. 4 is an exemplified user interface showing an image album having a plurality of images, and an indication that a photobook has been proactively created.
Figure 5A:
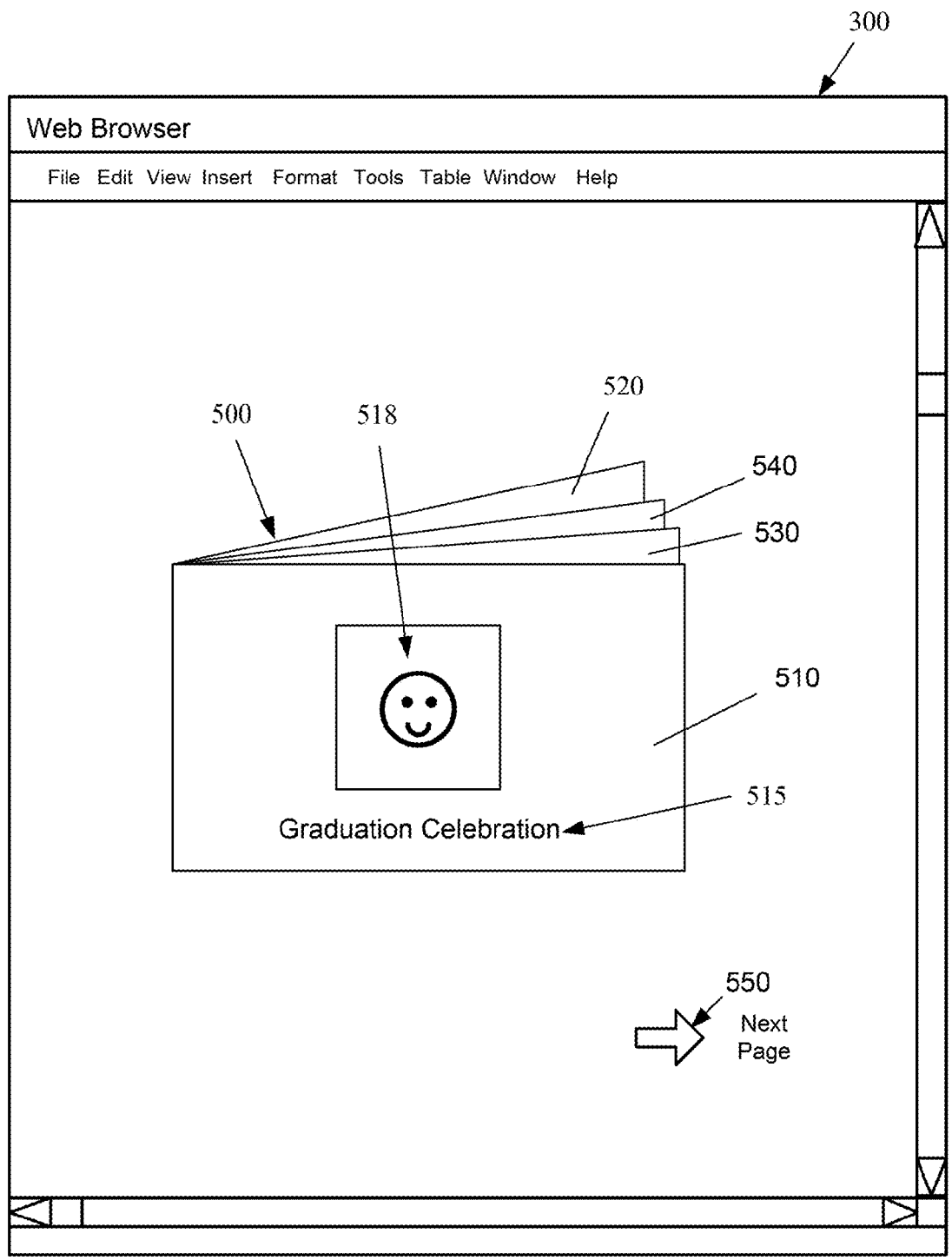
FIGS. 5A and 5B illustrate an exemplified user interface for showing a proactively created photobook.
Figure 5B:
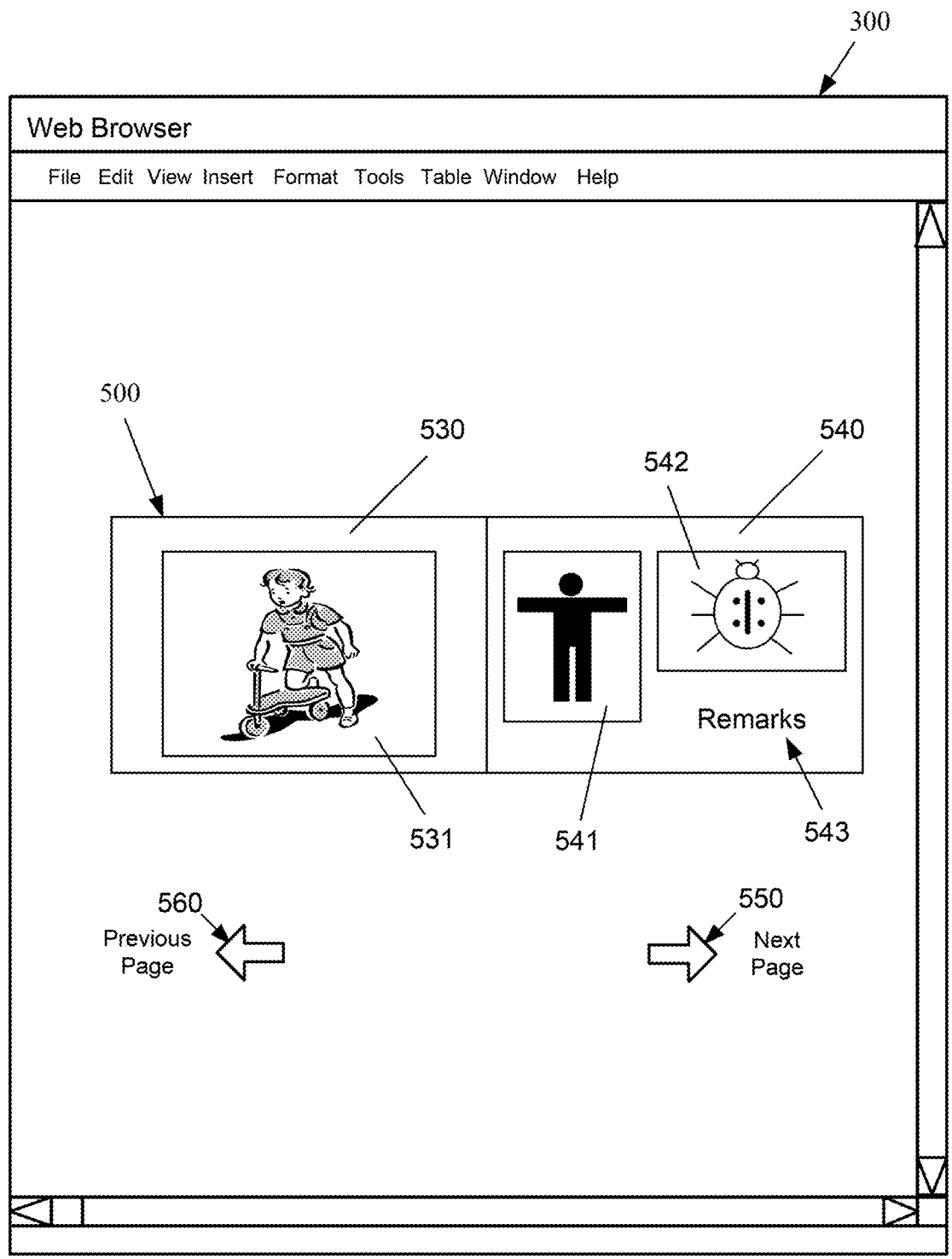

The proactively and automatically created design of the photobook can be presented by the computer system to a user for preview (step 250). As shown in FIG. 4, the user interface 300 can display a button 400 "See Your Photobook" to indicate that a photobook based on the images 320 in the image album 310 has been proactively created, and ready for the users view. A photobook design 500 is displayed in the user interface 300 after the user clicks the button 400, as shown in FIGS. 5A and 5B. The photobook can include a front cover 510, a back cover 520, and a plurality of pages 530, 540. The book title can be automatically selected from the name of the image album 310 (FIG. 3). The front cover 510 can include a book title 515 and an image 518 selected from the images 320 (FIG. 3). For example, the image 518 can be the first image in the album 310 or the image used (for a thumbnail image) to represent the image album 310. The page 530 can include an image 531. The page 540 can include images 541, 542, and text 543. The presentation of the photobook design 500 can include realistic illumination and texture to imitate effects of the materials in the selected book format.

The user can click arrow buttons 550, 560 to view different pages of the photobook. The cover and different pages of the photobook design 500 can also be played automatically like a slide show once the user clicks the button 400 (FIG. 4).

Optionally, the user is allowed to edit the photobook design 500 (step 260). The user can change, switch, or remove the images 518, 531, 541, and 542 on the book cover 510 and pages 530, 540. The user can also change text information such as the book cover 515 and the text 543. It should be noted that the photobook design 500 represents a complete design of a photobook that is ready to be ordered. The editing is an optional step depending on the user's time availability.

It should be understood that the proactively created photobook designs can be presented in many forms. As describe above, images identified to create a photobook design typically belong to a group, such as a group of shared images, posted images, uploaded images, or images selected for printing, etc. The proactively created photobook design is presented to the user at relevant places on the web pages, such as on a web page for confirming the share of the group of images, at a share web when the group of shared images are viewed, or at a page after a group of images have been ordered for printing. The image service provider can also proactively send an email to inform someone about the creation of the photobook design. For example, a user that just uploaded a group of images to the server managed by the image service provider may receive an email message from the service provider about the creation of the photobook design.

After the user has reviewed and optionally edited the photobook design 500, the user can save the photobook design 500 and order a physical manifestation of the photobook based on the to edit the photobook design 500 from the image service provider (step 270).

The image service provider can receive the order via the server 160 has a physical manifestation manufactured at the printing facility 170 according to the photobook design 500 (step 280).

Figure 6:
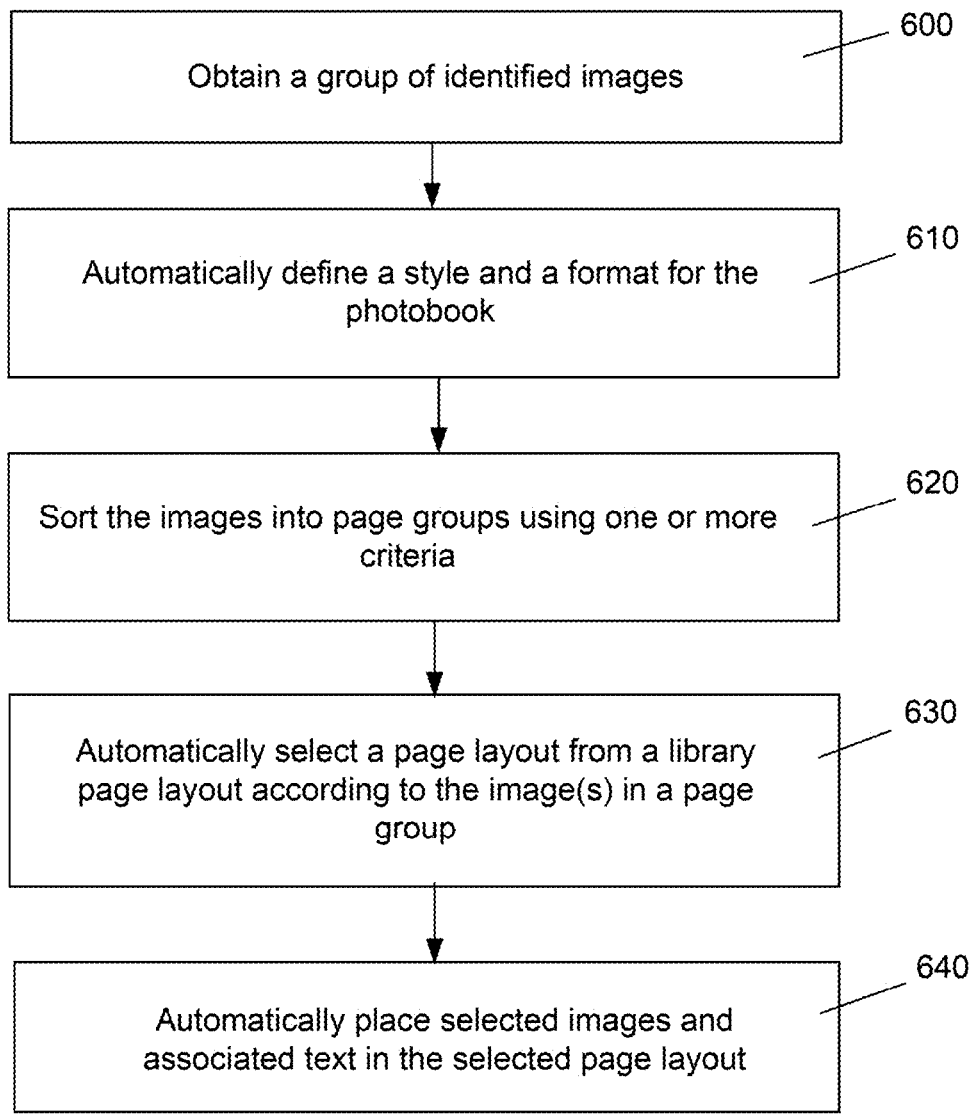
FIG. 6 shows a flow chart for proactively and automatically creating a design for a photobook in accordance to the present invention.
Figure 7:
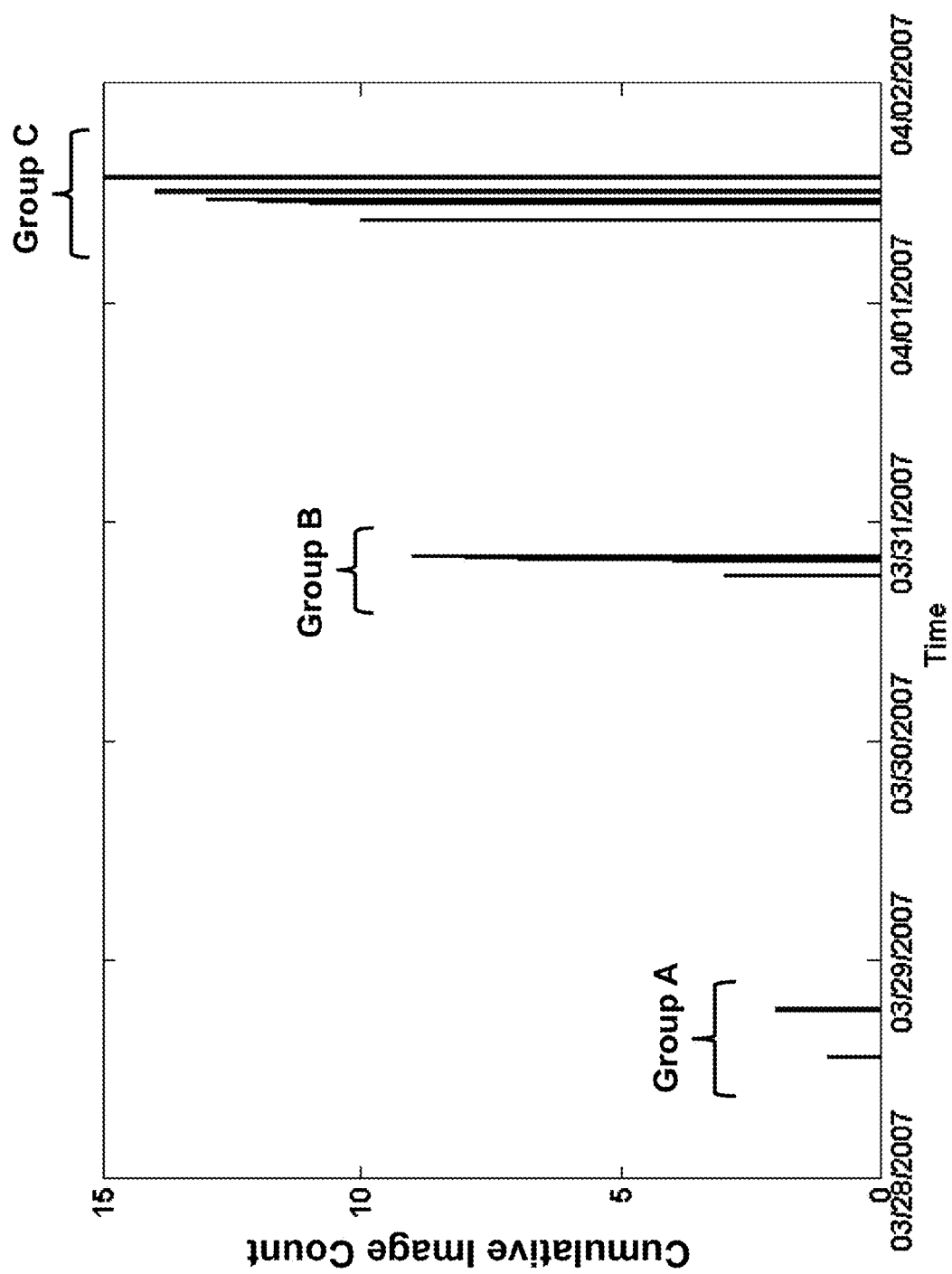
FIG. 7 illustrates sorting and grouping of images by image capture time in accordance to an aspect of the present application.

Details about the proactive design of a photobook (in steps 230-240, FIG. 2) are described below. Referring to FIG. 6, a group of images having numbers within a predetermined range are first obtained as described above by a computer system (step 600). A style and a format can be automatically selected for a photobook design (step 610). The images are sorted by one or more criteria to produce a desirable sequence that the images will be presented in a photo book (step 620). The criteria can include a primary criterion. For example, the images can be sorted by their associated image capture times. The image capture times can be extracted from the header information in the image files. For example, a JPEG image may include an EXIF header that includes the capture time of the image. It is stored by the digital camera in the image file as information in association with the image data. Referring to FIG. 7, a cumulative image count can be plotted against image capture time. In one implementation, the list of images can be sequenced chronically based on capture time of the images. Users often prefer to have images to appear in book pages in a chronological order. The images can be then separated into page groups using one or more secondary criteria. For example, images can be grouped according to capture time. Images captured in a short time interval are more likely suitable to be placed on the same page, facing pages, or adjacent pages in a photo book. In some embodiments, images that are taken in a short interval (e.g. a day) can be assigned to a same group (e.g. Group A, FIG. 7). The images in Group A, Group B, or Group C (FIG. 7) are captured in a short time interval. The images in each of these groups can be respectively grouped as candidates to appear on a same page, facing pages, or adjacent pages.

Figure 8:
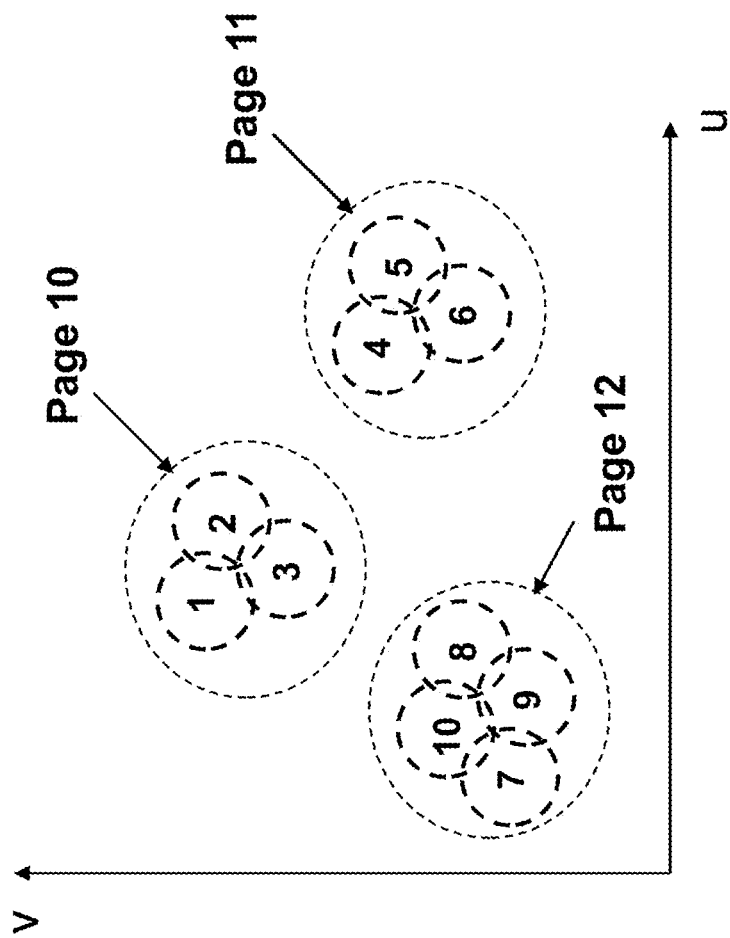
FIG. 8 illustrates sorting and grouping of images by image color content in accordance to another aspect of the present application.

The sorted images may be first placed into a group including a large number of images that do not fit on a page. For example, ten images in Group B (FIG. 7) are taken in a short time interval such a day. The images in Group B can be further separated into page groups using other secondary criteria such as color content and image capture locations. For instance, the most popular color of each of the ten images can be plotted in a color space (such as (Y, u, v), (L, a, b) etc.), as shown in FIG. 8. The color space is first separated into finite number of regions. The most popular color is defined as the color region that has the most pixel values that fall into. The ten images can be further sub-grouped according to their adjacencies in the color plane (u, v): images 1-3 may be categorized into a first group; images 4-6 may be categorized into a second group; images 7-10 may be categorized into a third group. The images 1-10 in Group A might have been taken within a same day. The photographer might have traveled to several different surroundings, such as a beach, a restaurant indoor, or a swimming pool at the hotel, each of which may have different color distributions. It should be understood that the display of color content distributions of images are not limited to a specific color coordinates or the two dimensional color plane shown in FIG. 8. The color distributions can be plotted in three dimensional color spaces (Y, u, v), (L, a, b), or two dimensional color planes such as (Y, u), (Y, v), (a, b), (L, a) etc. In some embodiments, the images with close distance in color space are intentionally separated across different pages in the photobook such as the images on a page will not look alike.

Figure 9:
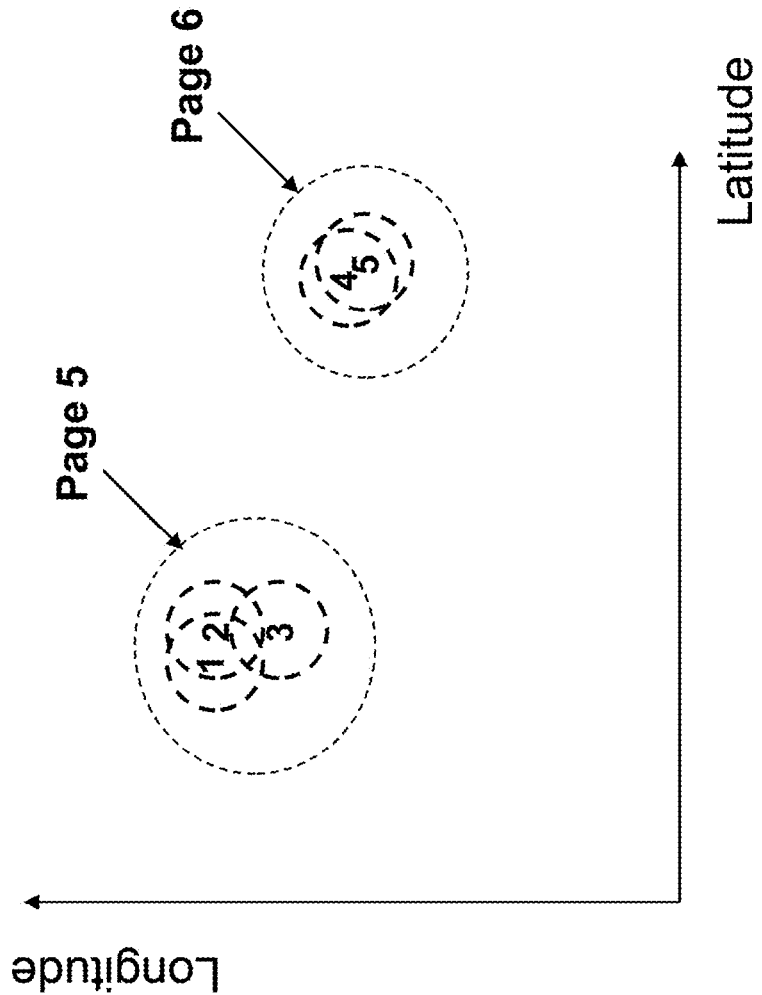
FIG. 9 illustrates sorting and grouping of images by image-capture location in accordance to another aspect of the present application.

In some embodiments, the images can be sorted or grouped based on geographic locations. For example, assuming Group C (FIG. 7) includes five images that are taken, for example, in a same day. Geo location information about each of the five images can be extracted from the header information of the five images, and plotted as shown in FIG. 9. Images 1-3 are shown to have been taken in close proximity while images 4-5 are taken at similar locations. Images 1-3 can be sub-grouped together and assigned to Page 4 of the photo book. Images 4-5 can be sub-grouped together and assigned to Page 5 of the photo book. In some embodiments, the Images 1-3 and the Images 4-5 can be assigned to be on facing pages (e.g. such as pages 4 and 5) such that the images from the same events can be viewed on facing pages in one open-book view. In some embodiments, the images with close geographic proximity are intentionally separated across different pages in the photobook such as the images on a page will not look alike. The placements of two page groups of images on facing pages can be based on one or more secondary criteria, such as image capture time, image color content, and image capture location.

A page layout is automatically selected from the library of page layouts in accordance with the properties of the images on the page as well as the text information associated with the image receiving areas in the page layout (step 630). The format of the image receiving field in the page layout matches the format of the selected image. For example, images in Group A (FIG. 7) may include two landscape images (L) and two portrait images (P). A notation for the image formats for Group A can be "LLPP". The page layout selected from the page-layout library should have four image receiving areas with matching image formats "LLPP".

The page layout also includes an image caption area positioned adjacent to the image receiving area for receiving the associated text information. For example, one portrait image and one landscape image may be selected for the next page. The portrait image has associated text information entered by the user and stored in conjunction with the portrait image. The landscape is not associated with any text information. In selecting a page layout, the disclosed system first select page layouts containing two image receiving areas, and then further selects page layouts that have include one portrait and one landscape image receiving areas. Additionally, the disclosed system further selects page layouts that include an image caption area in association with the portrait image receiving area. After the page layout is selected, the selected image(s) and associated text are automatically placed in the selected page layout (step 640). The placement of the selected image(s) and associated text can be done in a single step because they are pre-stored in an integrated data structure as described previously. The same steps can be repeated for fill the image fields and text fields in each page of a photo book. The user can select an image from the plurality of images to be used as part of the book cover. Details about arranging images in page layouts are disclosed in the above referenced commonly assigned U.S. patent application Ser. No. 12/406,873, titled "Smart photobook creation", the content of which is incorporated herein by reference.

Figure 10:
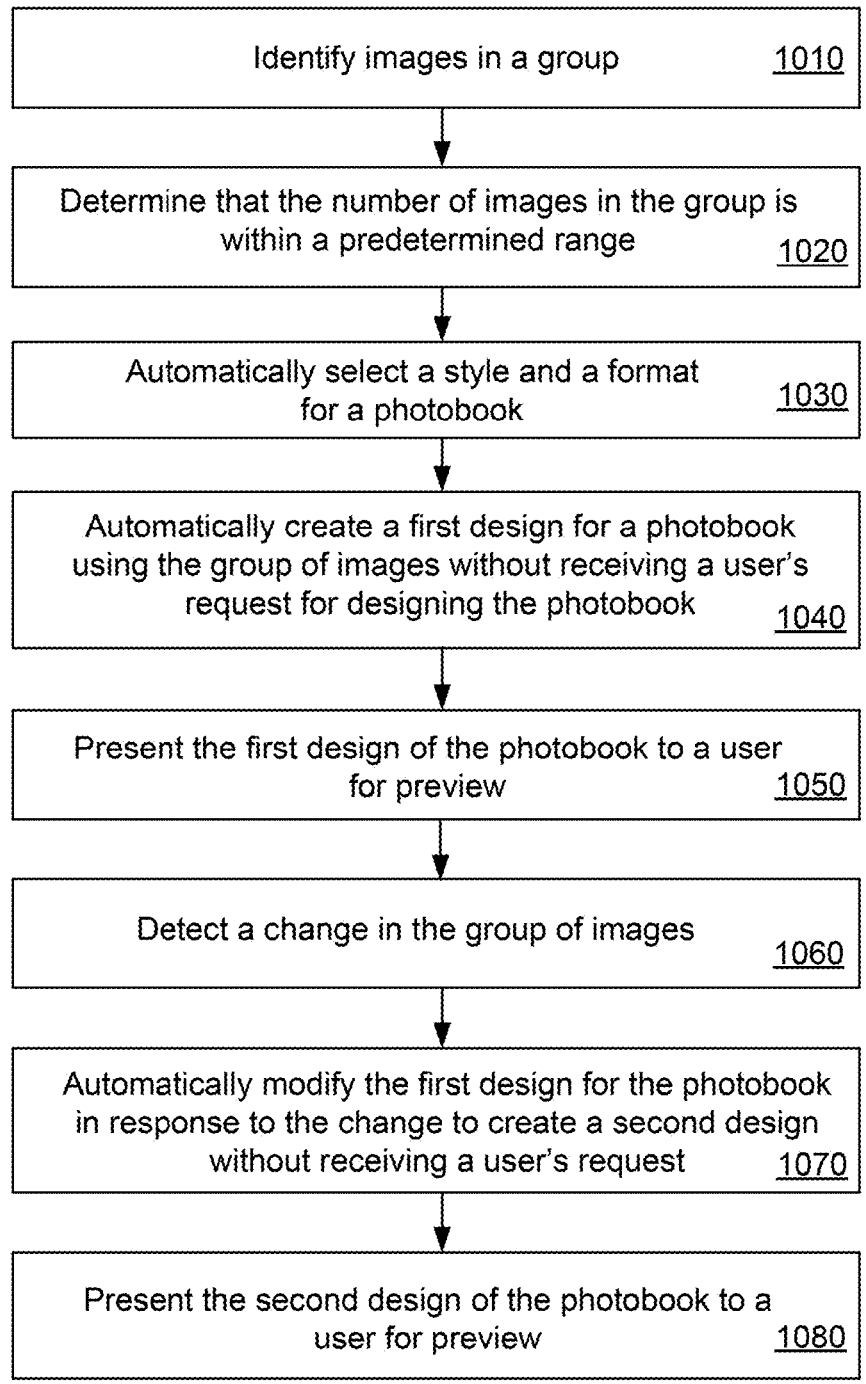
FIG. 10 shows a flow chart for proactively creating a photobook in accordance to another aspect of the present invention.

In some embodiments, the design of the photobook can be dynamically changed as the identified images change in the group. For example, the photobook design 500 can dynamically change as a user adds or removes images in and out of an image album (310, FIG. 3). The number of pages, the number of images per page, and the layout of images on the pages can automatically adapt to the changes to the images identified in the group. In general the process of updating photobook design can include the following steps: similar to the descriptions above in relation to steps 210-250 (FIG. 2), referring to FIG. 10, a group of images is first identified (step 1010). If the number of images in the identified group of images is determined to be in a predetermined range (step 1020), a style and a format are automatically selected for a photobook design (step 1030). A first design of a photobook is automatically created without receiving a request from a user (step 1040). The first design of the photobook is made available for the preview by a user (step 1050). When a change is detected in the group of identified images (step 1060), a second design of a photobook is automatically created without receiving a request from a user in response to the change detected in the group of images (step 1070). The change in the group of images can include addition to the group of images or removal of images from the group of images. The change in the group of images can also include a change in an image property of the group of images. The image property can include a tag, a keyword, a title of a folder where the images are placed, or metadata at least one of the images.

The second design of the photobook is subsequently presented for user's preview (step 1080). The change in the group of identified images can include addition, removal, a change in the sequence, addition of remarks and keywords, addition in change in tagging in a group of images. The uploading of images into an image folder/album can take more than one uploading events. The design of the photobook can be continually updated as new images are received by the image folder/album.

It should be understood that the library of page layout contains layouts with different numbers of images other than one, two, and three. For a given number of images on a page and for the given formats of the images, the page layout is not limited to the designs shown in this application. There can be a large variation of layout designs for the same number of images with the same formats on each page. Moreover, the sorting and grouping of images can be implemented by other approaches or using other metrics. The illustration of page grouping and page breaks for the images can also vary within the scope of the present disclosure. Moreover, the presently disclosed systems and methods are compatible with a software application installed locally on a computer device, client software in communication with a remote server, or a software application installed on a central server.

Figure 11:
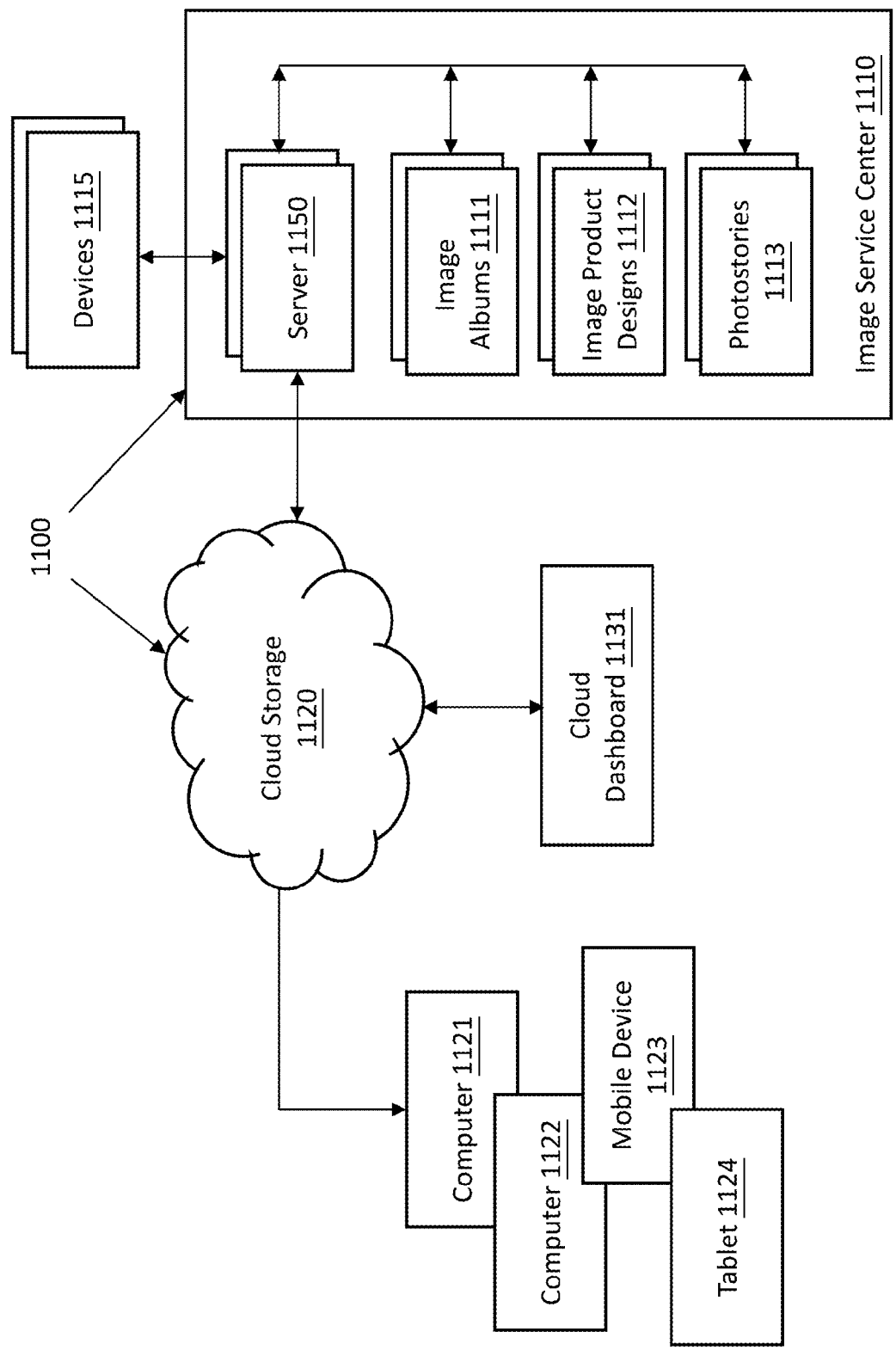
FIG. 11 is a block diagram for a network-based image service system for image data, image product designs, and photostories.

In some embodiments, referring to FIG. 11, a network-based image service system 1100 includes an image service center 1110 and one or more cloud storages 1120. Examples of the image service center 1110 include Shutterfly, Inc., which enables users to store, organize and share images from devices 1115 via wired or wireless networks. The image service center 1110 can include one or more servers 1150, a data center, and include or in communication with a product fulfillment center. The one or more server 1150 can include upload servers, email servers, application servers, image servers, and image or general purpose processors, etc. A user can upload images from a device 1115 to the image service center 1110, which can be organized and stored in image albums 1111.

The cloud storage 1120 can be established by the service provider responsible for the image service center 1110. The cloud storage 1120 can also be provided by third party systems. The cloud storage 1120 enables users to store, retrieve, and share files and folders across the Internet. The files can be synchronized with a variety of user devices 1121-1124 such as desktop or laptop computers, mobile phones, and tablet computer. The user devices can be run on different operating systems including Microsoft Windows, Mac OS X, Linux, as well as versions for mobile devices, such as Android, IOS, WebOS, Windows Mobile, and BlackBerry OS, and a browser-based client instead of a client installed on a local device.

Figure 12:
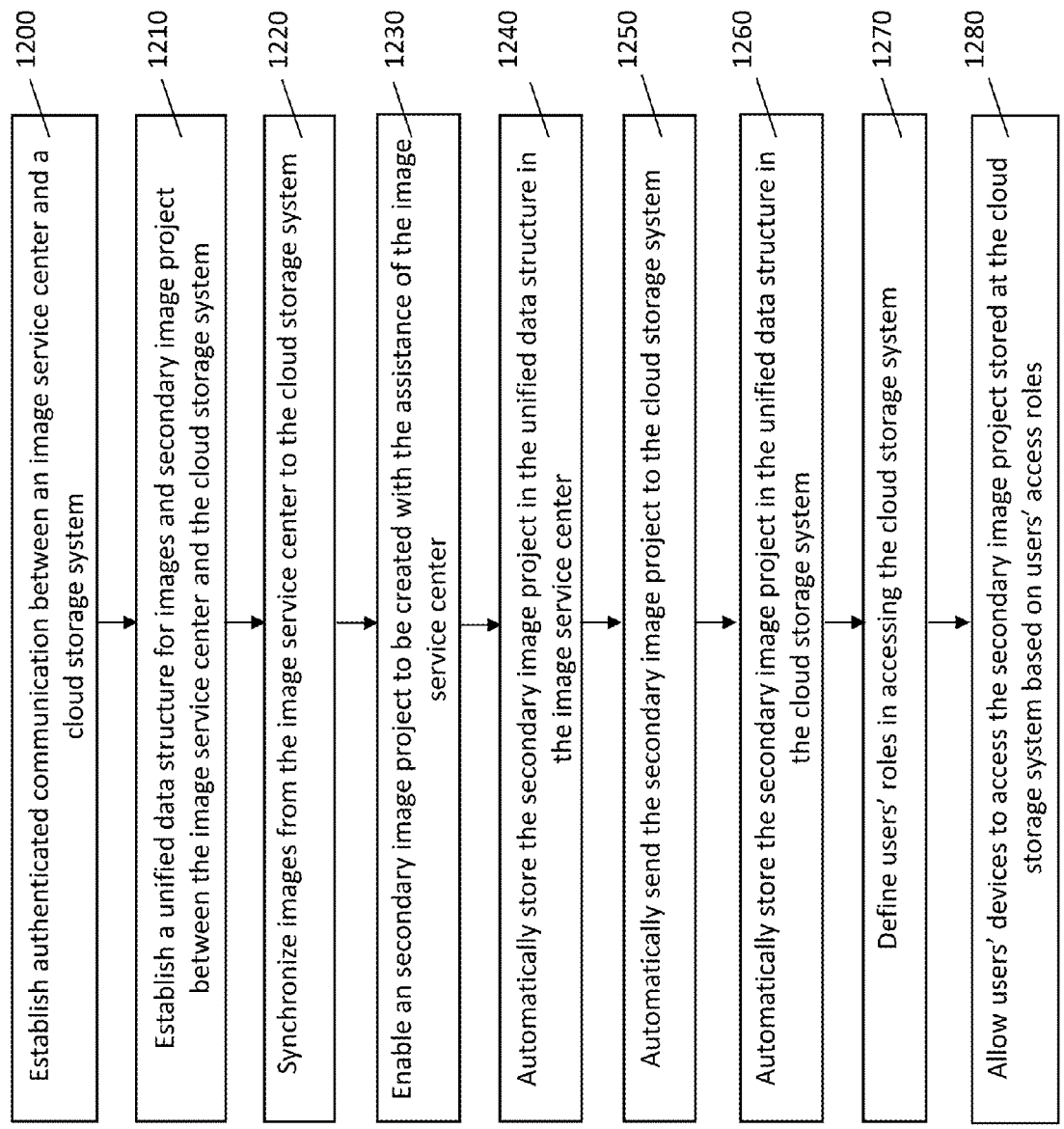
FIG. 12 is a flowchart for exemplified operations of the network-based image service system.

Referring to FIGS. 11 and 12, the image service center 1110 allows its user to establish authenticated communications between the user's account at the image service center 1110 and the cloud storage 1120 (step 1200). If the user already has an account at the cloud storage 1120, the two accounts can be linked with the user's log-in information and with user's authorization. If not, the user can set up an account at the cloud storage 1120 that is linked to the user's account at the image service center 1110. When the image service center 1110 and the cloud storage 1120 are enabled by the same service provider, the user can also have a joint account for both systems.

User's data transfers between the image service center 1110 and the cloud storage 1120 can be based on authentication application programming interface (API). The user can send and store pictures, video, and other files to the cloud storage 1120 from any of the devices 1121-1124. Communication between the devices 1121-1124 and the cloud storage 1120 can also be conducted via an authentication API. The image files can be automatically transferred into the user's image albums 1111 in the image service center 1110.

A unified data structure is pre-defined for image albums 1111 and secondary image projects such as image product designs 1112 and photostories 1113 at the image service center 1110 (step 1210). The unified data structure is mapped from the image service center 1110 to the cloud storage 1120 (step 1220). For example, a unified data structure can have a hierarchical structure including data fields for:

User identification;
Image albums and folders each comprising image product designs or photostories;
Specific image or image product design or photostory;
Metadata, tags, and keywords associated with the images, text, design elements in the images, or image product designs, or photostories.

The images stored in the image service center 1110 can be automatically synchronized with the cloud storage 1120 (step 1220). In other words, the images stored in the image service center 1110 can be sent to the cloud storage 1120 and saved in the unified data structure in the cloud storage 1120.

The servers 1150 can enable users to create a secondary image project such as image product designs 1112 and photostories 1113 using a web or client interface in communication with the image service center 1110 or a local client installed on the devices 1121-1124 (step 1230). The image products can be fulfilled for the users by fulfillment centers within or in connection to the image service center 1110. Examples of image products include photobooks, photo cards and stationeries, photo calendars, etc. Examples of the photostories 1113 can include digital scrapbooks, virtual greeting cards, videos produced from images, a coherent presentation of photos, text, and design elements presented in linear or two-dimensional patterns, and photo slideshows. The image product designs and photo stories can include personalized text, designs elements, users' photos, and sometimes sound files.

In some embodiments, the secondary image project such as the image product designs 1112 and the photostories 1113 can be proactively or automatically created by image applications run on the severs 1150 in the image service center 1110 or by client applications run on user devices 1121-1124, 1115 without being requested by a user (step 1230). For example, a group of images can be automatically identified by the severs 1150, and used to create a photobook or a photo calendar by the severs 1150 in the image service center 1110. Furthermore, images stored in the same or across different albums can be analyzed and identified by the severs 1150. Images sharing a common theme can be automatically selected by the severs 1150 to form a photo story. The photostories 1113 and the image product designs 1112 include images as well as design components such as text, image borders, image edit properties (e.g. cropping, color enhancement, image border, red-eye removal, image rotation, image background, embellishment . . . ). Examples of the image products include photobooks, greeting cards, photo calendars, stationeries, photo gifts. The metadata, tags, and keywords can include descriptors (occasions, events), image capture times, image upload times, image capture locations, image edit properties, image captions, and image borders. Details of computer assisted or automated creation of image products or image projects without user request are described above in relation to FIGS. 1-10.

When an image product or a photostory is created on a device (e.g. 1115, 1121-1124) or at a web user interface to the image service center 1110, the created secondary image project is stored at the image service center 1110 (step 1240). The created secondary image project is automatically sent to (step 1250) and stored (step 1260) at the cloud storage 1120.

An advantage of the disclosed system is that they can significantly save users' time spent on transferring, saving, or organizing images from multiple devices. The disclosed systems and methods allow image projects and image product designs created on a device or at an image service center to be automatically stored at cloud storage and made accessible to other devices that are connected or not connected to the image service center. The accesses to a group of or individual images, image product designs, and photostories by different users can be flexibly defined by the owner of the data.

Another advantage of the disclosed system is that the creation (users' devices or image service center) of the secondary image project and the storage and sharing (e.g. cloud storage) of the secondary image project can be performed by different systems, which can minimize cost of data traffic over the network and allow each system to be optimized for it individual functions. It should be noted that the image product or the photostory can be automatically created by the server 1150 in the image service center 1110 can be automatically stored and accessed at the cloud storage 1120. In other words, the data synchronization between the image service center 1110 and the cloud storage 1120 are not limited to user data uploaded to the image service center 1110 or the cloud storage 1120. Secondary image projects such as image product designs and photostories are also automatically synchronized with the cloud storage 1120 in the pre-defined unified data structure.

A user can use a client, a web interface in communication with the image service center 1110 or a cloud dashboard 1131 to manage and edit images, photostories, and image product designs stored at the cloud storage 1120, which is automatically synchronized with the user's image albums 1111, image product designs 1112, and photostories 1113 in image service center 1110. The cloud dashboard 1131 can be connected to the cloud storage 1120 via a web socket. The user can also authorize his or her friends and family members to view and to contribute to the user's images, photostories, and image product designs at the cloud storage 1120 and at the image service center 1110 (step 1270). For example, the user can assign other users roles such as: viewer, contributor, commenter, editor, etc. Moreover, different images, photostories, videos, files, or different folders can be defined to be accessed by different members.

Referring to FIG. 13, an exemplified user interface 1300 in communication with the image service center 1110 or the cloud dashboard 1131 includes a control panel 1310 that the owner Raymond can use to define other users' roles (step 1270) in accessing Raymond data stored in the cloud storage 1120 and the image service center 1110. Raymond has the highest access level as manager, editor, contributor, commenter, and viewer. Raymond's wife is assigned as an editor, contributor, commenter, and viewer. Grandparents 1, 2 and a sibling may be assigned the roles of contributor, commenter, and viewer. A relative (e.g. a cousin) may have the role of commenter and viewer. A friend may be only a viewer. In general, users having higher level roles also have access rights of the lower level roles. The control panel 1310 can for example include a plurality of selectable controls such as selection buttons 1320 which allow the owner Raymond to easily define roles for different users. The levels of user accesses can be defined for each image album, folders of product designs or photostories in the cloud storage 1120 for the application of the image service center 1110.

The levels of user accesses can also be based on individual images, product designs, or photostories. In some embodiments, the levels of user accesses are defined by tags associated with the images, image product designs, or photostories. The secondary image project such as image project and photostories will be accessible on other devices 1121-1124 step 1280). The user can view, edit, share, or order the image products or photostories using different devices 1121-1124. The images, or photostories, or image products in the image service center 1110 and the cloud storage 1120 are labeled with time stamp for proper version control.

The disclosed systems and methods can include one or more of the following advantages: The disclosed systems and methods can significantly save users' time spent on transferring, saving, or organizing images from multiple devices. The disclosed systems and methods allow photostories and image product created on one device to be automatically stored at cloud storage and made accessible to other devices. Moreover, the accesses to a group of or individual images, photostories, and image products by different users can be flexibly defined by the owner of the data.

What is claimed is:

1. A computer-implemented method for providing image services over a computer network, comprising:
    establishing a unified data structure between an image service center and a cloud storage system, wherein the unified data structure defines images and secondary image projects associated with a first user;
    storing images in the image service center according to the unified data structure;
    automatically sending the images from the image service center to the cloud storage system;
    automatically storing the images according to the unified data structure in the cloud storage system;
    automatically identifying a group of images in the unified data structure;
    determining number of images in the group;
    comparing the number of images in the group with a predetermined range by a computer processor;
    automatically creating, by the computer processor, a secondary image project incorporating the images in the group without receiving a user request for creating an image project if the number of images in the group is within the predetermined range, wherein the step of automatically creating a secondary image project comprises automatically selecting at least one page layout for the secondary image project; and placing the images in the page layout;
    automatically storing the secondary image project according to the unified data structure in the cloud storage system; and
    sending the secondary image project stored at the cloud storage system to users' devices.

2. The computer-implemented method of claim 1, wherein the secondary image project is automatically created without receiving user request.

3. The computer-implemented method of claim 1, wherein the secondary image project is automatically created by one or more servers in the image service center.

4. The computer-implemented method of claim 1, wherein the secondary image project is automatically created by a client application in communication with the image service center.

5. The computer-implemented method of claim 1, wherein the secondary image project is automatically created on a user device using a web interface in communication with the image service center.

6. The computer-implemented method of claim 1, wherein the secondary image project comprises an image product design.

7. The computer-implemented method of claim 1, wherein the unified data structure includes a user identification, one or more image albums, and one or more folders each comprising one or more secondary image projects.

8. The computer-implemented method of claim 1, further comprising:
    receiving from a first user, definition of roles of the users in accessing the secondary image project stored in the cloud storage system.

9. The computer-implemented method of claim 8, wherein the secondary image project stored at the cloud storage system are accessed by the users' devices based on corresponding users' access roles.

10. The computer-implemented method of claim 1, wherein the secondary image project includes a photobook that incorporates the images associated with the user.

11. The computer-implemented method of claim 10, further comprising:
    automatically selecting a format or a style for the design of the photobook.

12. The computer-implemented method of claim 11, further comprising:
    assigning a portion of the images into a first page group and a second page group each comprising one or more images;
    placing the first page group of one or more images in the first page of the photobook; and
    placing the second page group of one or more images in the second page of the photobook.

13. The computer-implemented method of claim 12, further comprising:
    automatically selecting a first page layout from a library of page layouts, wherein the first page group of one or more images are placed in the first page according to the first page layout; and
    automatically selecting a second page layout from the library of page layouts, wherein the second page group of one or more images are placed in the second page according to the second page layout.

14. The computer-implemented method of claim 12, wherein at least two of the portion of images are separated into the first page group and the second page group based on capture times of the two images.

15. The computer-implemented method of claim 12, wherein at least two of the portion of images are separated into the first page group and the second page group based on color content of the two images.

16. The computer-implemented method of claim 12, wherein at least two of the portion of images are separated into the first page group and the second page group based on image-capture locations of the two images.

17. A computer-implemented method for providing image services over a computer network, comprising:
    establishing a unified data structure between an image service center and an cloud storage system, wherein the unified data structure define images and secondary image projects associated with a first user, wherein the secondary image projects include image product designs;

enabling an image product design to be created incorporating one or more of the images comprising:
    identifying a group of images in the unified data structure;
    determining number of images in the group; and
    automatically creating the image product design incorporating the images in the group without receiving a user request for creating an image project if the number of images in the group is within the predetermined range wherein the step of automatically creating a secondary image project comprises automatically selecting at least one page layout for the secondary image project; and placing the images in the page layout;
automatically storing the image product design according to the unified data structure in the image service center;
automatically sending the image product design to the cloud storage system;
automatically storing the image product design according to the unified data structure in the cloud storage system; and
sending the secondary image project stored at the cloud storage system to users' devices.

18. The computer-implemented method of claim 17, wherein the image product design is automatically created without receiving a request from a user.

19. The computer-implemented method of claim 18, wherein the image product design is initiated by a user and enabled by the image service center.

* * * * *